June 23, 1953 W. K. DOW 2,642,670
GAUGE
Filed Feb. 19, 1949 2 Sheets-Sheet 1
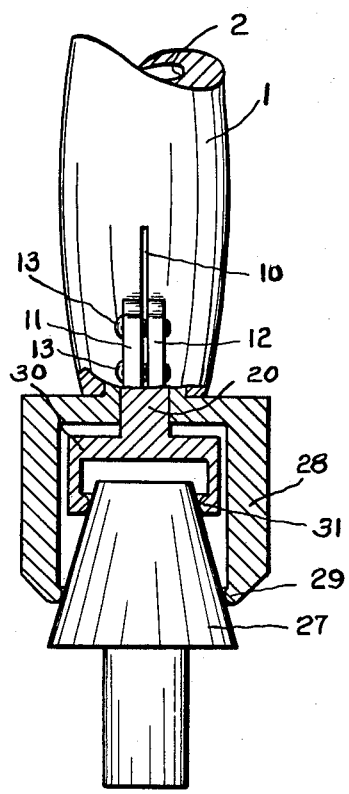
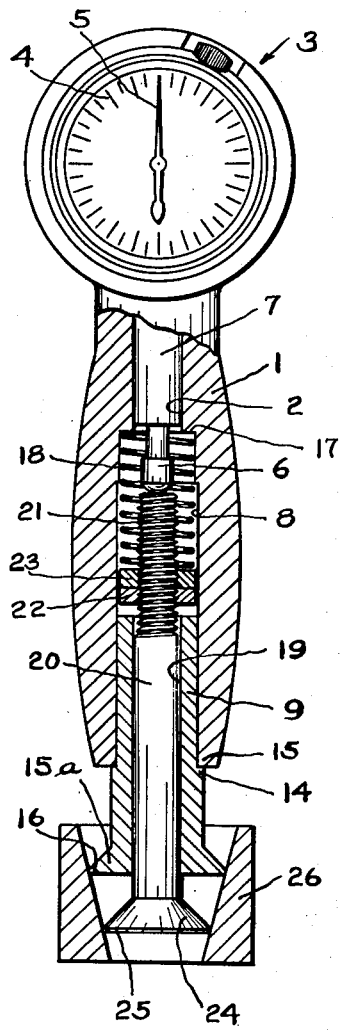
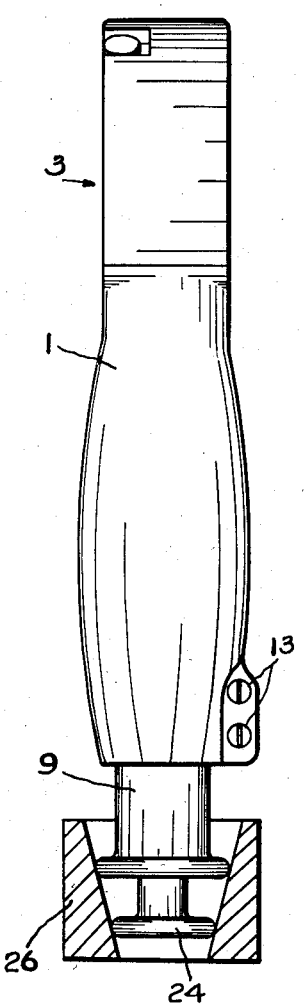
INVENTOR.
WALTER K. DOW
BY
Raymond A. Paquin
ATTORNEY.

June 23, 1953  W. K. DOW  2,642,670
GAUGE
Filed Feb. 19, 1949　　　　　　　　　　　　　　　2 Sheets-Sheet 2
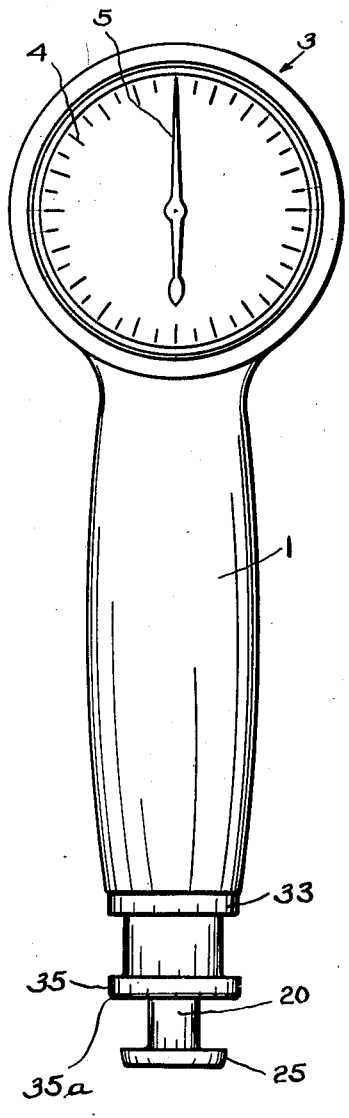
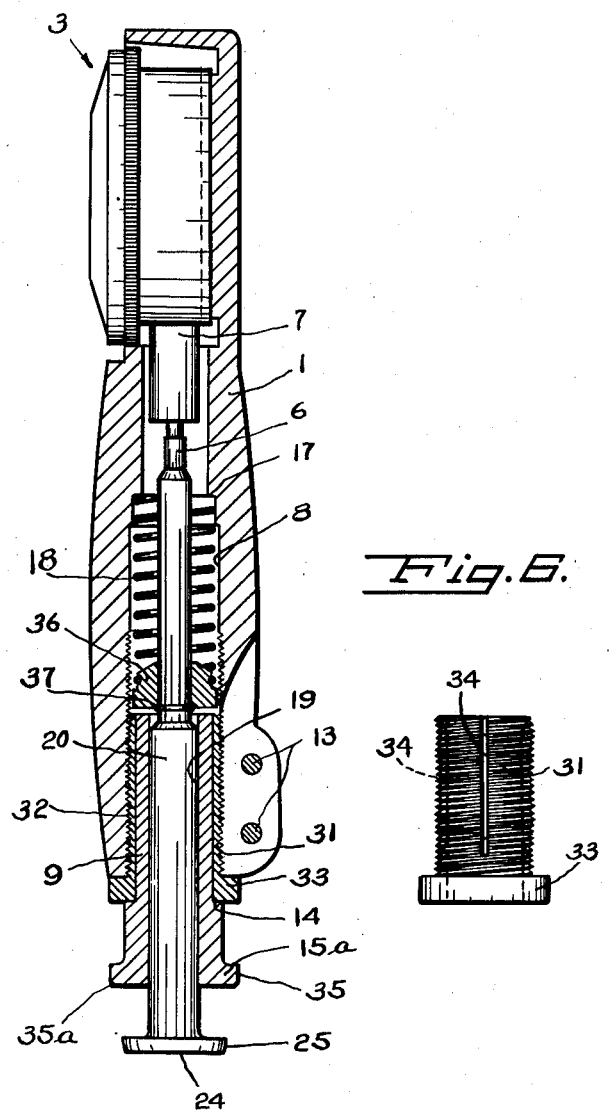
INVENTOR.
WALTER K. DOW
BY Raymond A. Paquin
ATTORNEY.

Patented June 23, 1953

2,642,670

UNITED STATES PATENT OFFICE 2,642,670

GAUGE

Walter K. Dow, Longmeadow, Mass.

Application February 19, 1949, Serial No. 77,330

6 Claims. (Cl. 33—174)

This invention relates to new and improved means for measuring or comparing dimensions of manufactured, molded or formed parts and has particular reference to such a device which is adapted for use in connection with parts having internal or external tapered dimensions.

An object of the invention is to provide a precision type gauge of simplified construction for use in all types of manufacturing.

Another object of the invention is to provide a device of the type set forth which employs a standard type dial indicator.

Another object of the invention is to provide a gauge of the type set forth which is relatively simple and economical in construction yet efficient and accurate in operation.

Another object of the invention is to provide a gauge for the control of internal and external tapered dimensions in the manufacture of repetitive parts where the requirement is for interchangeability of such parts.

Other objects and advantages of the invention will become apparent from the following description taken in connection with the accompanying drawings and it will be understood that changes may be made in the details of construction and arrangement of parts without departing from the scope of the invention as set forth in the accompanying claims, as the preferred form of the invention has been shown by way of illustration only.

Referring to the drawings:

Fig. 1 is a plan view, partially in section, of a gauge embodying the invention;

Fig. 2 is a side view thereof;

Fig. 3 is a fragmentary view thereof showing the gauge adapted for use in connection with externally tapered parts;

Fig. 4 is a sectional view taken on line 4—4 of Fig. 5, looking in the direction of the arrows;

Fig. 5 is a top or plan view showing a modified form of the invention; and

Fig. 6 is a side view of the adjusting member employed in the form of the invention shown in Figs. 4 and 5.

Measurement of both internal and external tapers has been the source of considerable manufacturing difficulty over the years. In fact the most practiced method used today is exactly the same as was used a hundred years ago and consists of the use of Prussian blue or other coloring means applied to the taper being checked and then entering the part into a female part or facsimile thereof determined to be the desired taper and noting the markings made in the coloring medium.

Another practiced method is to dispense with the coloring medium and depend upon the feel or shake of a master plug or ring of predetermined taper which often becomes most difficult where the tapers are of small diameter or of short length.

Still another means (the slowest but probably the most accurate) is the use of a sine bar set up on a surface plate. This method is slow and cumbersome and requires the work of a skilled tool maker or inspector versed in trigonometry.

Heretofore the relative position of an angle or taper has often been determined by the use of a contact line on the taper and its relative position to a point outside or off the taper. My invention relates to the use of two contact lines on or in the taper as the case may be and the measurement of their distance apart as compared to a master or predetermined taper.

Assuming that we have a female taper one inch long, one half inch in diameter at its smallest end and an included angle of fifteen degrees, we can readily show the application of this invention to angle checking. By the use of simple trigonometrical functions of angles we can now determine that the large end of the above taper opening is an exact diameter so long as the length remains one inch. Now then if we assume the large end diameter to remain constant and the small end diameter to remain constant, by changing the distance between these two diameters, we change the angle. Therefore, my invention as described relates to a device for picking up this differential in distance between two contact diameters on a taper and converting said differential into thousandths or ten thousandths of an inch by the use of an indicator. My invention will likewise have stamped or engraved on one of its angle contacting members a constant or conversion formula showing the number of degrees, minutes or seconds the basic angle changes in a given number of thousandths change in distance between contact diameters.

While the above has been accomplished in layout form on the drawing board, on the surface plate with the aid of sine bar and micrometers my invention relates to a simple device for eliminating the necessary trigonometry calculations and reducing the checking or comparing of internal and/or external tapers to the simple reading of an indicator.

Referring more particularly to the drawings wherein similar reference characters designate corresponding parts throughout the several views, the invention comprises a handle portion 1 which is formed of such contour as to provide a holding or gripping portion adapted to be held by the hand of the operator during the use of the device and which is provided with the central bore 2 extending through the member 1.

Adjacent one end of the handle member 1 is positioned the dial indicator indicated generally at 3 and which includes a calibrated scale 4 and a rotatable indicator hand 5 which is angularly movable thereover in accordance with the movement of the indicator actuator pin 6 which extends through the protective sleeve 7, which sleeve 7 and actuator pin 6 extend into the bore 2 with the fit between the sleeve 7 and bore 2 preferably being such that the indicator may be removed for replacement but will normally be retained in operative position on the handle 1.

The bore 2 is provided with a portion 8 adapted to receive a tubular gauge member 9 which may be of such dimension as to be retained in the bore 8 through the close fit between the bore 8 and the external diameter of the member 9 or, as shown, the handle member 1 may be provided with the slot 10 in the end thereof adjacent the member 9 and provided with the flanges 11 and 12 adapted to be drawn together by the screws or bolts 13 to lock the member 9 in operative position in the bore 8.

The member 9 may be provided with the shoulder 14 adapted to engage the end 15 of the member 1 for locking the member 9 in desired position relative to the handle member 1.

The member 9 also is provided adjacent its free end with the flange 15a which has the gauge surface 16 adjacent the periphery thereof and which may be substantially knife edged as shown in Fig. 1 or rounded as shown in Fig. 2 or of other desired contour.

Between the bores 2 and 8 is a spring seat 17 which may be formed by making the bore 8 of larger diameter than the bore 2 as shown and which is adapted to engage one end of the coil spring 18 which is positioned within the bore 8 as hereinafter described.

Within the bore 19 of the tubular member 9 is positioned the sliding gauge member 20 which preferably has its external diameter of such size that a close sliding fit is provided between the member 20 and the bore 19 for accuracy in gauging. The member 20 has its end 21 in the bore 8 threaded so as to receive the adjusting nut 22 and lock nut 23 for limiting the movement of the member 20 in the bore 19 and the nut 23 is also adapted to engage the end of the coil spring 18 whereby said spring normally urges the nut 23 into engagement with the adjacent end of the tubular member 9 and thereby retains the flange gauging portion 24 adjacent the outer or free end of the member 20 towards the outermost adjusted limit which may be varied through adjustment of the nuts 22 and 23.

The flange 24 may be provided with the substantially sharp or knife contacting edge 25 as shown in Fig. 1 or the rounded contacting surface as shown in Figs. 2 and 3 or of other desired contour.

The form of the invention shown in Figs. 1 and 2 is adapted for gauging, that is, measuring or comparing the internal tapered surfaces of manufactured parts or for comparing them with the internal tapered surfaces of a master part 26 which is known to be of the desired dimensional characteristics.

In Fig. 3 the gauge is shown adapted for use in connection with external tapered surfaces and this form of the invention may be employed for comparing such external tapered surfaces with the external dimensional characteristics of a standard or known sample 27 as shown. In this form of the invention the member 9 is provided with the hollow or cup shaped portion 28 adjacent its free end and having internal contacting edge 29 which may be rounded as shown or which may be of the contour shown for the contacting edges 16 and 25 in Fig. 1. In this form of the invention the sliding member 20 is provided with the hollow or cupped portion 30 having the internal peripheral contact 31 which may be curved or otherwise formed as previously described.

The form of the invention shown in Figs. 4 to 6 inclusive is generally similar to that shown in Figs. 1 to 3 inclusive except that there is provided the threaded adjusting sleeve 31 adapted to engage the threaded portion 32 in the bore 8 and this sleeve 31 is provided with the flange 33 and also has a desired number of spaced slots 34 of which there are preferably four spaced at equal distances in the periphery of the member 31.

The gauge member 9 has a shoulder extending into the sleeve 31 with the flange 14 engaging the flange 33 on the adjusting member 31. The gauge member 9 has the flange 15A with the gauge surface 35 which is generally similar to the gauge surface 15 shown in Fig. 1 but preferably has a portion of its contour formed to the basic angle to be measured for a distance of at least $\frac{1}{64}$ of an inch and the remainder of its contour may be of desired outline so long as it does not interfere with the measurement to be made.

The gauge member 20 is provided with the collar 36 which is retained in position by the snap ring 37 which fits in a peripheral groove in the surface of the member 20. The collar 36 acts as a seat for the spring 18 as shown.

In this construction the groove in the periphery of the member 20 for the snap ring 27 is so positioned that the collar 36 acts as a stop in the same manner as the nut 22 in the form of the invention shown in Fig. 1.

The gauging portion 24 on the member 20 may be formed with its contacting edge 25 formed with a spherical radius with this radius tangent to the angle of the taper being checked.

It is pointed out that preferably at least one of the contact surfaces 25 or 35 have tapers equal to the mean taper being checked which may be less than ten per cent of its length and also that the contact or gauge surface of the movable and stationary members may have cylindrical edges of approximately ninety degrees.

The tapered surfaces of precision parts may be checked as shown in the drawings as follows:

Where the tapered surface to be checked is an internal surface as shown in Figs. 1 and 2, the master part whose dimensional characteristics it is desired to reproduce in the parts to be checked is slipped over the flanges 15A and 24 until the tapered surface is in engagement with the contact edges 25 and 16 and the reading at such time taken upon the calibrated scale of the indicator 3. As the manufactured parts having tapered surfaces to be checked with the tapered surfaces of the master parts are placed in the same position successively, the reading on the scale is compared with that obtained for the master sample. If desired, a table may be provided which is so computed as to show variances in the dimensional characteristics of the taper for each graduation on the indicator dial where-upon it is possible to readily ascertain the physical variances in the dimensions of the parts.

The checking of external diameters with the device shown in Fig. 3 is obtained in a similar manner by placing the standard or master part 27 within the hollow portions 28 and 30 and with the external tapered surface of the part 27 in engagement with the contact surfaces 29 and 30 as shown.

From the foregoing it will be seen that I have provided simple, efficient and economical means for obtaining all of the objects and advantages of the invention.

Having described my invention, I claim:

1. In a device of the character described, a support having a bore, a dial gauge supported adjacent one end of said bore and having the actuator pin thereof extending into said bore, a tubular gauge member having a portion extending into said bore from the end thereof opposite said dial gauge and having a peripheral shoulder adjacent the end of said support, a sliding gauge member extending through said tubular gauge member and adapted to engage and actuate the actuator pin of said dial gauge and means in said bore for urging said sliding gauge member in a direction away from said actuator pin.

2. In a device of the character described, a support having a bore, a dial gauge supported adjacent one end of said bore and having the actuator pin thereof extending into said bore, a tubular gauge member having a portion extending into said bore from the end thereof opposite said dial gauge and having a peripheral shoulder adjacent the end of said support, a sliding gauge member extending through said tubular gauge member and adapted to engage and actuate the actuator pin of said dial gauge and means in said bore for urging said sliding gauge member in a direction away from said actuator pin, said means comprising an adjustable stop member on said sliding gauge member and a spring engaging said adjustable stop member.

3. In a device of the character described, a support having a bore, a dial gauge supported adjacent one end of said bore and having the actuator pin thereof extending into said bore, a tubular gauge member having a portion extending into said bore from the end thereof opposite said dial gauge and having a peripheral shoulder adjacent the end of said support, a sliding gauge member extending through said tubular gauge member and adapted to engage and actuate the actuator pin of said dial gauge and means in said bore for urging said sliding gauge member in a direction away from said actuator pin, said support being split at the end thereof adjacent said tubular gauge member and means for locking said tubular gauge split ends to lock said tubular gauge member in position in said bore.

4. In a device of the character described, a support having a bore, a dial gauge supported adjacent one end of said bore and having the actuator pin thereof extending into said bore, a tubular gauge member having a portion extending into said bore from the end thereof opposite said dial gauge and having a peripheral shoulder adjacent the end of said support, a sliding gauge member extending through said tubular gauge member and adapted to engage and actuate the actuator pin of said dial gauge and means in said bore for urging said sliding gauge member in a direction away from said actuator pin, said means comprising an adjustable stop member on said sliding gauge member and a spring engaging said adjustable stop member, said support being split at the end thereof adjacent said tubular gauge member and means for locking said split ends to lock said tubular gauge member in position in said bore.

5. In a device of the character described, a support having a bore, a dial gauge supported adjacent one end of said bore and having the actuator pin thereof extending into said bore, a tubular gauge member having a portion extending into said bore from the end thereof opposite said dial gauge and having a peripheral shoulder adjacent the end of said support, a sliding gauge member extending through said tubular gauge member and adapted to engage and actuate the actuator pin of said dial gauge and means in said bore for urging said sliding gauge member in a direction away from said actuator pin, said tubular gauge member and sliding gauge member each having peripheral contact surfaces adjacent their outer ends.

6. In a device of the character described, a support having a bore, a dial gauge supported adjacent one end of said bore and having the actuator pin thereof extending into said bore, a tubular gauge member having a portion extending into said bore from the end thereof opposite said dial gauge and having a peripheral shoulder adjacent the end of said support, a sliding gauge member extending through said tubular gauge member and adapted to engage and actuate the actuator pin of said dial gauge and means in said bore for urging said sliding gauge member in a direction away from said actuator pin, said means comprising an adjustable stop member on said sliding gauge member and a spring engaging said adjustable stop member, said tubular gauge member and sliding gauge member each having peripheral contact surfaces adjacent their outer ends.

WALTER K. DOW.

References Cited in the file of this patent

UNITED STATES PATENTS

| Number | Name | Date |
|---|---|---|
| 1,469,343 | Strong | Oct. 2, 1923 |
| 1,571,783 | Aulenback | Feb. 2, 1926 |
| 1,602,645 | Buckingham | Oct. 12, 1926 |
| 1,664,535 | Bartholdy | Apr. 3, 1928 |
| 1,922,895 | Lemaire | Aug. 15, 1933 |
| 2,039,224 | Hutchinson | Apr. 28, 1936 |
| 2,490,376 | Rupley | Dec. 6, 1949 |

FOREIGN PATENTS

| Number | Country | Date |
|---|---|---|
| 455,963 | Germany | Feb. 13, 1928 |
| 587,175 | Great Britain | Apr. 16, 1947 |